(12) United States Patent
Chen et al.

(10) Patent No.: US 7,515,351 B2
(45) Date of Patent: Apr. 7, 2009

(54) INVERSE TELEPHOTO WITH CORRECTION LENSES

(75) Inventors: Chun Shan Chen, Taichung (TW);
Hsiang Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 11/946,836

(22) Filed: Nov. 28, 2007

(65) Prior Publication Data
US 2009/0009887 A1    Jan. 8, 2009

(30) Foreign Application Priority Data
Jul. 5, 2007    (TW)    .............................. 96124474 A

(51) Int. Cl.
*G02B 15/14*    (2006.01)
(52) U.S. Cl. .................. 359/680; 359/761; 359/793
(58) Field of Classification Search ................. 359/680, 359/682, 683, 684, 686, 739, 761, 763, 765
See application file for complete search history.

(56) References Cited

U.S. PATENT DOCUMENTS 5,071,235 A * 12/1991 Mori et al. .................. 359/692
5,159,494 A * 10/1992 Yamanashi .................. 359/689
6,124,982 A *  9/2000 Usui .......................... 359/686
6,259,508 B1 *  7/2001 Shigematsu .................. 355/53
7,151,637 B2 * 12/2006 Tochigi et al. .............. 359/685

* cited by examiner

*Primary Examiner*—Timothy J Thompson
(74) *Attorney, Agent, or Firm*—Bander Shia

(57) ABSTRACT

An inverse telephoto with correction lenses comprises five lens elements with refractive power, from the object side to the image side: a first lens element with negative refractive power having a concave image-side surface; a second lens element with positive refractive power having a convex image-side surface; a third lens element with a convex object-side surface; a fourth lens element with a concave image-side surface; a fifth lens element with positive refractive power having a convex image-side surface, at least one of an object-side surface and the image-side surface of the fifth lens element being aspheric; and an aperture stop located between the first lens element and the second lens element. At least three of the surfaces of the first, second, third, fourth and fifth lens elements are aspheric.

18 Claims, 4 Drawing Sheets

INVERSE TELEPHOTO WITH CORRECTION LENSES

BACKGROUND OF THE INVENTION

1. Field of the Invention

The present invention relates to an inverse telephoto with correction lenses, and more particularly to a miniaturized inverse telephoto with correction lenses used in a PC CAMERA.

2. Description of the Prior Art

In recent years, with the popularity of electronic image taking equipment, such as the PC camera, and the mobile phone camera, the inverse telephoto with correction lenses has become thinner and thinner, and the sensor of a general digital camera is none other than CCD (Charge Coupled Device) or CMOS (Complementary Metal Oxide Semiconductor). Due to advances in semiconductor manufacturing, the pixel size of sensors has been reduced continuously, and miniaturized optical lens systems for taking image have increasingly higher resolution. Therefore, the demand for image quality is increasing.

The lens assembly of a conventional PC CAMERA is usually arranged in such a manner that the front lens group is negative and the rear lens group is positive, namely, the so-called inverse telephoto structure, so as to obtain a wide field of view. And to reduce the incident angle of the light with respect to the sensor, the refractive power of the rear lens group should be improved. Usually, an ordinary rear lens group consists of two plano-convex lens elements with convex surfaces facing each other, this is the so-called RAMSDAN structure. The front lens group has negative refractive power and the rear lens group has positive refractive power, and this is an inverse telephoto. The conventional optical system here particularly refers to RAMSDAN structure of the inverse telephoto, and this structure has the following disadvantages:

The incident angle of the light with respect to the object-side surface of the second lens element of the rear lens group is too large, and as a result, the sensitivity will be increased comparatively, and the light at this position is likely to be divergent. Therefore, the system will not be stable.

The present invention mitigates and/or obviates the aforedescribed disadvantages.

SUMMARY OF THE INVENTION

The primary objective of the present invention is to improve the image quality and effectively reduce the volume of the optical lens system while maintaining enough back focal length, the present invention provides a whole new five-lens type optical lens system.

An inverse telephoto with correction lenses in accordance with the present invention comprises five lens elements with refractive power, from the object side to the image side:

a first lens element with negative refractive power having a concave image-side surface;

a second lens element with positive refractive power having a convex image-side surface;

a third lens element with a convex object-side surface;

a fourth lens element with a concave image-side surface;

a fifth lens element with positive refractive power having a convex image-side surface, at least one of the object-side surface and the image-side surface of the fifth lens element being aspheric; and an aperture stop located between the first lens element and the second lens element;

in the optical lens system, at least three of the surfaces of the first, second, third, fourth and fifth lens elements are aspheric.

In the inverse telephoto with correction lenses, the first lens element with negative refractive power broadens the field of view of the inverse telephoto with correction lenses. The second lens element with positive refractive power mainly supplies the refractive power to the inverse telephoto with correction lenses of the present invention and corrects the spherical aberration caused by the optical lens system. The third and fourth lens elements and the fifth lens element with positive refractive power are generally used to further correct the various aberrations caused by the system. The image-side surface of the second lens element and the object-side surface of the third lens element are convex and face each other. With positive refractive power of the fifth lens element, the problem of light divergence can be effectively prevented.

If the third and fourth lens elements are glued together to form a combined lens unit with positive refractive power and the third lens element with positive refractive power is made of crown glass, the fourth lens element with negative refractive power is made of flint glass, the combined lens unit can effectively eliminate the chromatic aberration of the inverse telephoto with correction lenses.

The image-side surface of the first lens element is concave, so it can broaden the field of view of the inverse telephoto with correction lenses. The object-side surface of the first lens element can be either concave or convex. If the object-side surface of the first lens element is concave, this further increases the negative refractive power of the first lens element. In this case, it must form inflection points on the object-side surface of the first lens element, and make the value of radius of curvature at a periphery of the object-side surface of the first lens element positive, so as to improve the stability of the off axis light. Herein the periphery of the object-side surface of the first lens element is defined at the position of 60-80% of the effective diameter. The object-side surface of the second lens element is concave. The second lens element with positive refractive power cooperates with the first lens element to form an Inverse Telephoto structure which can effectively reduce the coma aberration caused by the optical lens system.

The aperture stop is located close to the object, so that the exit pupil of the optical lens system will be far away from the image plane. Therefore, the light will be projected onto the sensor with a relatively small incident angle, this is the telecentric feature of the image side, and this feature is very important to the photosensitive power of the current solid-state sensor, and can improve the photosensitivity of the sensor while reducing the probability of the occurrence of shading. And inflection points are formed on the fifth lens element to contribute to a better correction of the incident angle of the off axis light with respect to the sensor. But, for a wide-angle optical system, it particularly needs to correct the distortion and the chromatic aberration of magnification, the correction method is to arrange the aperture stop closer to the image plane to balance the refractive power of the optical system. So the aperture stop of the optical lens system of the present invention is located between the first lens element and the second lens element, the purpose of such an arrangement is to balance the telecentric property and wide field of view.

With the miniaturization of the optical lens system and the requirement of a large field of view, the focal length of the optical lens system is becoming very short. Therefore, the absolute value of the radius of curvature and the size of the lens elements must be very small, and it is impossible to make such glass lens elements by the conventional grinding method. Plastic material is introduced to make lens elements by injection molding, using relatively low cost to produce high precision lens elements. The surfaces of lens elements are aspheric, allowing more design parameters (than spherical surfaces), so as to better reduce the aberration and the number of the lens elements.

In the present inverse telephoto with correction lenses, the refractive index of the first lens element is N1, the refractive index of the second lens element is N2, and they satisfy the relations:

$1.52 < N1 < 1.6$ $1.52 < N2 < 1.6.$

If the refractive indices of the first lens element and the second lens element are within the range as stated above, it will be easy to find an appropriate plastic optical material to match the optical lens system.

In the present inverse telephoto with correction lenses, a focal length of the first lens element is f1, a focal length of the second lens element is f2, a focal length of the inverse telephoto with correction lenses is f, and they satisfy the relations:

$-1.2 < f/f1 < -0.7$ $0.4 < f/f2 < 0.9.$

The first lens element with negative refractive power broadens the field of view of the inverse telephoto with correction lenses. But if the value of f/f1 is smaller than the above lower limit, the total track length of the optical lens system will be difficult to reduce. And if the value of f/f1 is greater than the above upper limit, it will be difficult to broaden the field of view of the optical lens system. The second lens element with positive refractive power provides the main refractive power of the optical lens system, but if the value of f/f2 is greater than the above upper limit, the high order aberration of the optical lens system will be too great. And if the value of f/f2 is lower than the above lower limit, the total track length of the optical lens system will be difficult to reduce. Further, it will be better if f/f1 and f/f2 satisfy the relations:

$-1.1 < f/f1 < -0.8$ $0.5 < f/f2 < 0.8.$

In the present inverse telephoto with correction lenses, the combined focal length of the third and fourth lens elements is f34, a focal length of the fifth lens element is f5, a focal length of the inverse telephoto with correction lenses is f, and they satisfy the relations:

$0.1 < f/f34 < 0.5$ $0.1 < f/f5 < 0.5.$

The third and fourth lens elements and the fifth lens element with positive refractive power are generally used to further correct the various aberrations caused by the system. And the combined structure of the third and fourth lens elements can effectively eliminate the chromatic aberration of the inverse telephoto with correction lenses. If the value of the f/f34 and that of f/f5 are within the above range, it can maintain an appropriate back focal length for the inverse telephoto with correction lenses, and can effectively correct the astigmatism aberration and distortion caused by the optical lens system.

In the present inverse telephoto with correction lenses, an on-axis distance between the fourth lens element and the fifth lens element is T45, and it satisfies the relation:

$T45 > 0.1$ mm.

If the value of T45 is greater than the above lower limit, it can effectively correct the astigmatism aberration caused by off axis light divergence. And it will be better if the value of T45 satisfies the below relation:

$T45/f > 0.02.$

In the present inverse telephoto with correction lenses, a radius of curvature of the object-side surface of the second lens element is R3, a radius of curvature of the image-side surface of the second lens element is R4, and they satisfy the relation:

$3.0 < R3/R4 < 9.0.$

The image-side surface of the second lens element provides the main refractive power of the optical lens system, if the value of R3/R4 is greater than the above upper limit, the absolute value of R4 will be too small, which will result in an excessively great high order aberration of the optical lens system. If the value of R3/R4 is lower than the above lower limit, the absolute value of R4 will be too great, and the total track length of the optical lens system will be too long.

In the present inverse telephoto with correction lenses, an object to be photographed is imaged on an electronic sensor, a total track length of the optical lens system is TTL, an image height of the optical lens system is Imgh, and they satisfy the relation:

$TTL/ImgH < 4.75.$

DETAILED DESCRIPTION OF THE PREFERRED EMBODIMENTS

Figure 1:
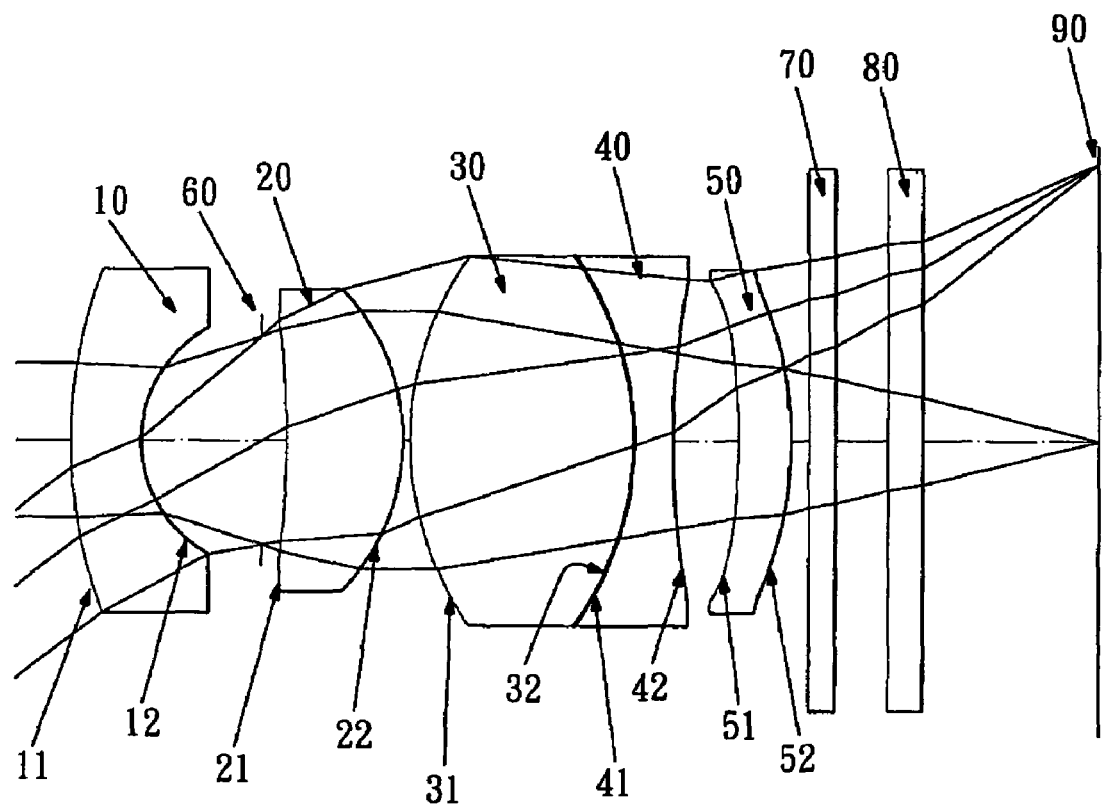
FIG. 1 shows an inverse telephoto with correction lenses in accordance with a first embodiment of the present invention.
Figure 2:
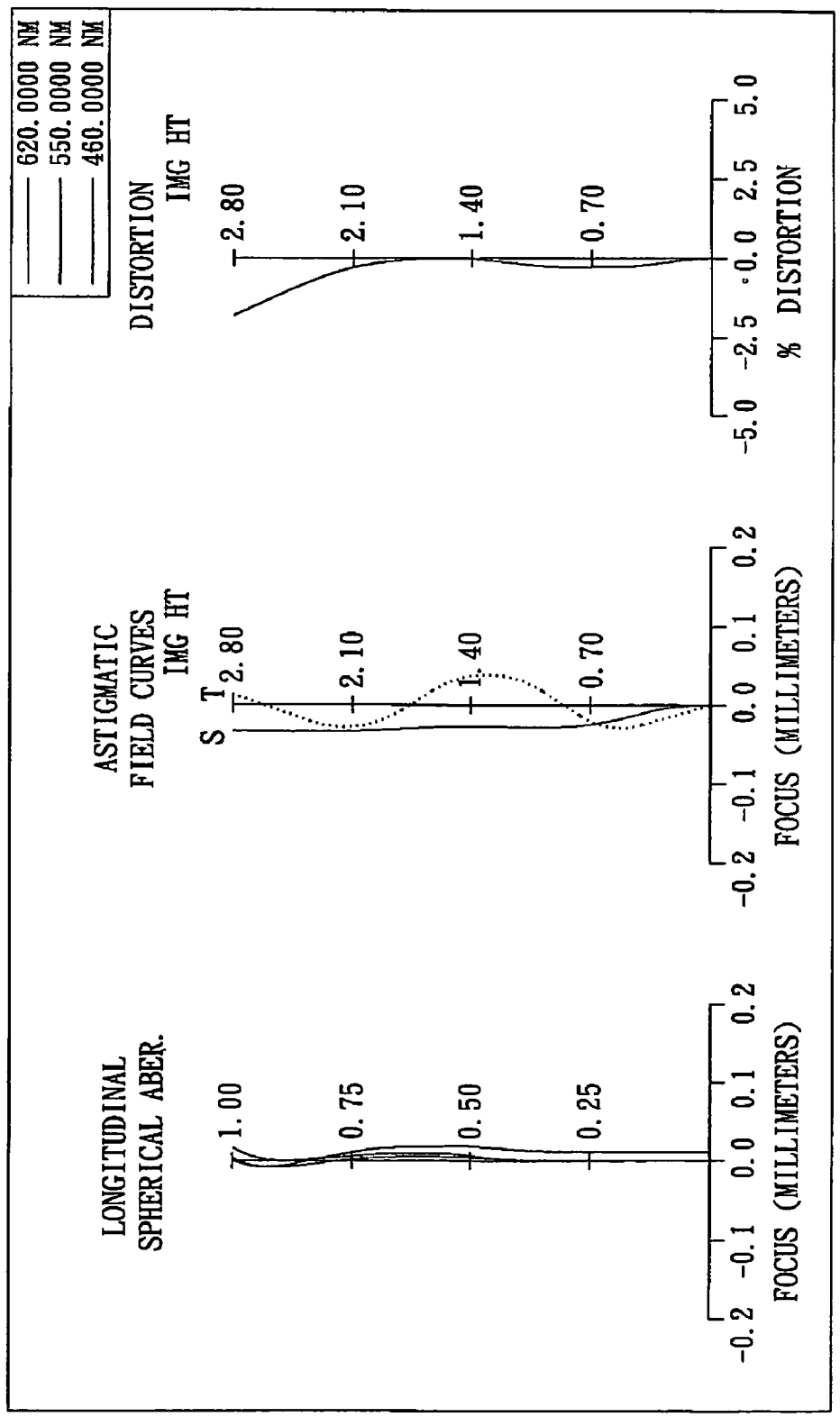
FIG. 2 shows the aberration curve of the first embodiment of the present invention.

Referring to FIG. 1, which shows an inverse telephoto with correction lenses in accordance with a first embodiment of the present invention, and FIG. 2 shows the aberration curve of the first embodiment of the present invention. The first embodiment of the present invention is an inverse telephoto with correction lenses comprising five lens elements with refractive power, and the inverse telephoto with correction lenses comprises: from the object side to the image side:

A plastic first lens element 10 with negative refractive power has a convex object-side surface 11 and a concave image-side surface 12, and the object-side surface 11 and the image-side surface 12 of the first lens element 10 are aspheric.

A plastic second lens element 20 with positive refractive power has a concave object-side surface 21 and a convex image-side surface 22, and the object-side surface 21 and the image-side surface 22 of the second lens element 20 are aspheric.

A glass third lens element 30 with positive refractive power has a convex object-side surface 31 and a convex image-side surface 32, and the object-side surface 31 and the image-side surface 32 are spherical.

A glass fourth lens element 40 with negative refractive power has a concave object-side surface 41 and a concave image-side surface 42, and the object-side surface 41 and the image-side surface 42 are spherical.

A plastic fifth lens element 50 with positive refractive power has a concave object-side surface 51 and a convex image-side surface 52, the object-side surface 51 and the image-side surface 52 are aspheric, and an inflection point is formed on the image-side surface 52.

An aperture stop 60 is located between the first lens element 10 and the second lens element 20.

An IR cut filter 70 is located behind the fifth lens element 50 and has no influence on the focal length of the optical lens system.

A sensor cover glass 80 is located behind the IR cut filter 70 and has no influence on the focal length of the optical lens system.

An image plane 90 is located behind the sensor cover glass 80.

The equation of the curve of the aspheric surfaces is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric lens surface at a distance Y from the optical axis relative to the tangential plane of the aspheric surface vertex;

Y: the distance from the point on the curve of the aspheric surface to the optical axis;

k: the conic coefficient;

Ai: the ith aspheric coefficient.

The focal length of the first lens element is f1, the focal length of the second lens element is f2, the third and fourth lens elements are glued together, and their effective focal length is f34, the focal length of the fifth lens element is f5, the focal length of the inverse telephoto with correction lenses is f, and they satisfy the relations:

$f/f1=-0.85, f/f2=0.55, f/f34=0.39, f/f5=0.39$.

In the first embodiment of the present inverse telephoto with correction lenses, the on-axis distance between the fourth lens element and the fifth lens element is T45, the focal length of the inverse telephoto with correction lenses is f, and they satisfy the relations:

$T45=0.776$ mm, $T45/f=0.207$.

In the first embodiment of the present inverse telephoto with correction lenses, the refractive index of the first lens element is N1, the refractive index of the second lens element is N2, and they satisfy the relations:

$N1=1.530$ $N2=1.530$.

In the first embodiment of the present inverse telephoto with correction lenses, the radius of curvature of the object-side surface of the second lens element is R3, the radius of curvature of the image-side surface of the second lens element is R4, and they satisfy the relation:

$R3/R4=4.05$.

In the first embodiment of the present inverse telephoto with correction lenses, the total track length of the optical lens system is TTL, the image height of the optical lens system is ImgH, and they satisfy the relation:

$TTL/ImgH=4.23$.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 3.74 mm, Fno = 2.0, HFOV(half of field of view) = 37.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 6.99590(ASP) | 0.800 | Plastic | 1.530 | 55.8 | −4.37 |
| 2 | | 1.67511(ASP) | 1.399 | | | | |
| 3 | Aperture Stop | Plano | 0.274 | | | | |
| 4 | Lens 2 | −11.50390(ASP) | 1.360 | Plastic | 1.530 | 55.8 | 6.73 |
| 5 | | −2.84193(ASP) | 0.070 | | | | |
| 6 | Lens 3 | 3.95180 | 2.580 | Glass | 1.729 | 54.6 | 3.13 |
| 7 | | −3.95180 | 0.010 | 'CEMT' | | | |
| 8 | Lens 4 | −3.94740 | 0.450 | Glass | 1.847 | 23.7 | −3.28 |
| 9 | | 10.21230 | 0.776 | | | | |
| 10 | Lens 5 | −16.05810(ASP) | 0.600 | Plastic | 1.530 | 55.8 | 9.37 |
| 11 | | −3.85380(ASP) | 0.200 | | | | |
| 12 | IR-filter | Plano | 0.300 | Glass | 1.517 | 64.1 | |
| 13 | | Plano | 0.600 | | | | |
| 14 | Cover Glass | Plano | 0.400 | Glass | 1.517 | 64.1 | |
| 15 | | Plano | 2.000 | | | | |
| 16 | Image | Plano | | | | | |

TABLE 2

Aspheric Coefficients

| Surface # | 1 | 2 | 4 | 5 | 10 | 11 |
|---|---|---|---|---|---|---|
| K = | −3.30036E+00 | −8.87903E−01 | 0.00000E+00 | 6.00000E−01 | −9.31993E+02 | 1.42060E+00 |
| A4 = | 1.80798E−02 | 6.73145E−02 | 4.65828E−03 | 7.95483E−05 | −2.67821E−02 | 1.06499E−02 |
| A6 = | −5.01521E−03 | −2.36362E−03 | 2.66994E−04 | −2.37906E−04 | 9.82870E−03 | 2.66514E−03 |
| A8 = | 5.17502E−04 | 2.30181E−03 | 1.91416E−04 | −6.73484E−05 | −4.11938E−03 | −1.10888E−03 |
| A10 = | −3.02892E−05 | 4.49609E−04 | −1.10900E−04 | 2.69196E−05 | 5.10438E−04 | 1.82004E−04 |

Figure 3:
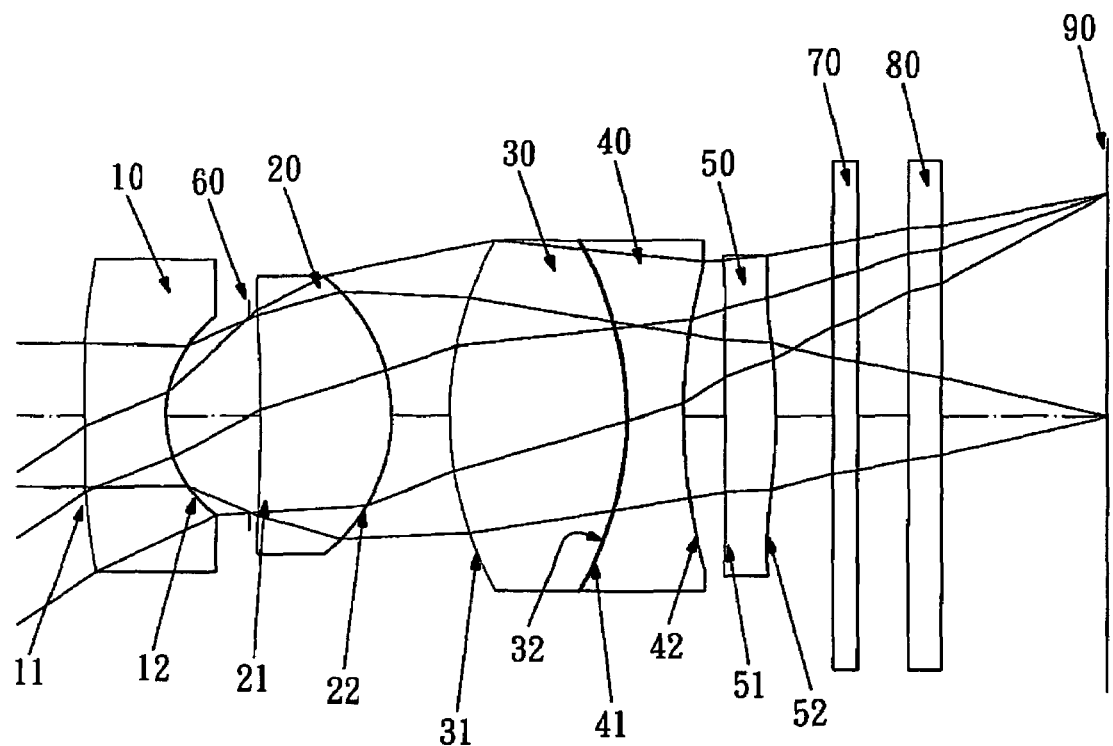
FIG. 3 shows an inverse telephoto with correction lenses in accordance with a second embodiment of the present invention.
Figure 4:
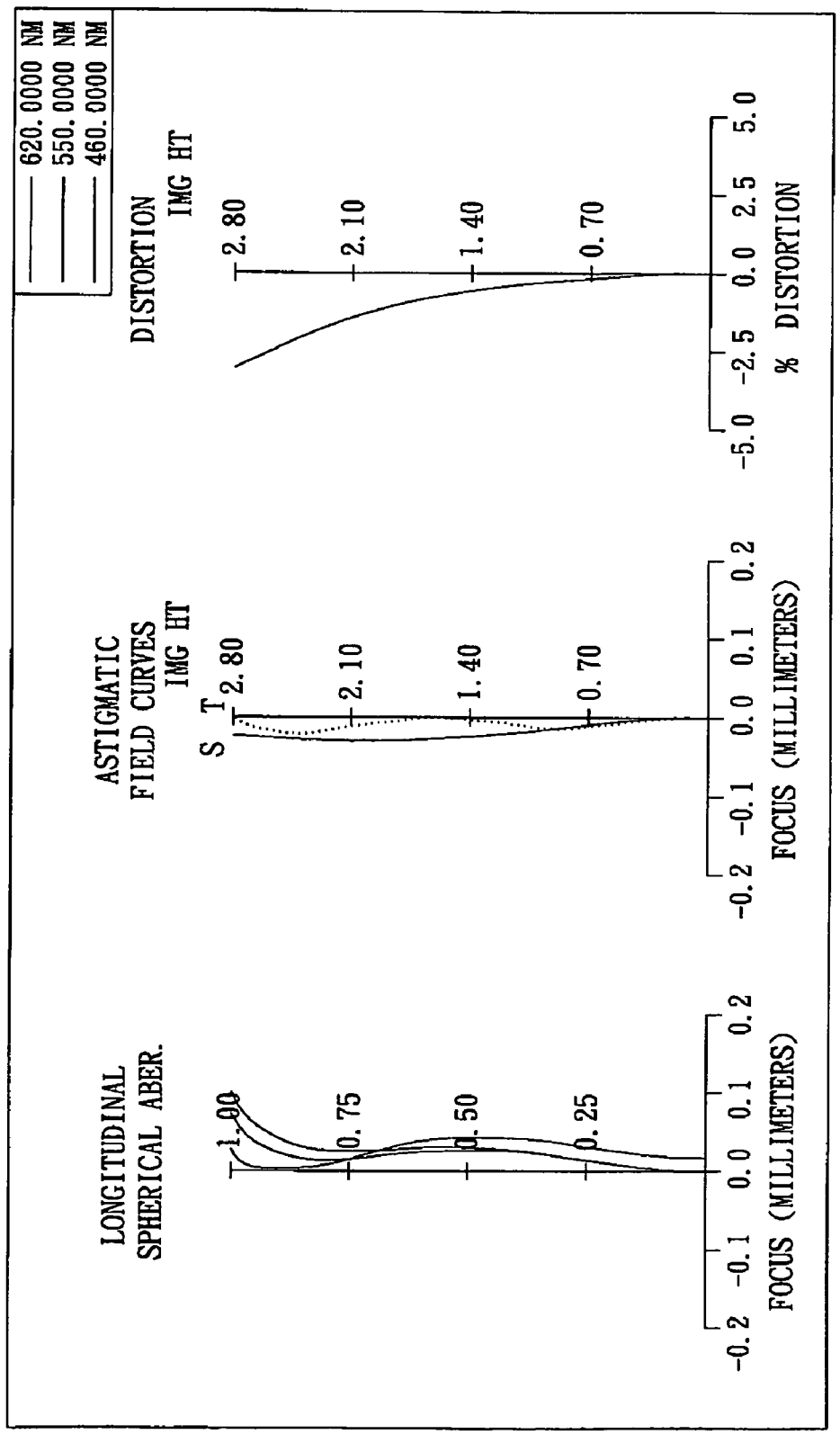
FIG. 4 shows the aberration curve of the second embodiment of the present invention.

Referring to FIG. 3, which shows an inverse telephoto with correction lenses in accordance with a second embodiment of the present invention, and FIG. 4 shows the aberration curve of the second embodiment of the present invention. The second embodiment of the present invention is an inverse telephoto with correction lenses comprising five lens elements with refractive power, and the inverse telephoto with correction lenses comprises: from the object side to the image side:

A plastic first lens element 10 with negative refractive power has a concave object-side surface 11 and a concave image-side surface 12, the object-side surface 11 and the image-side surface 12 of the first lens element 10 are aspheric, and the radius of curvature at the periphery of the object-side surface 11 is positive.

A plastic second lens element 20 with positive refractive power has a concave object-side surface 21 and a convex image-side surface 22, and the object-side surface 21 and the image-side surface 22 of the second lens element 20 are aspheric.

A glass third lens element 30 with positive refractive power has a convex object-side surface 31 and a convex image-side surface 32, and the object-side surface 31 and the image-side surface 32 are spherical.

A glass fourth lens element 40 with negative refractive power has a concave object-side surface 41 and a concave image-side surface 42, and the object-side surface 41 and the image-side surface 42 are spherical.

A plastic fifth lens element 50 with positive refractive power has a convex object-side surface 51 and a convex image-side surface 52, the object-side surface 51 and the image-side surface 52 are aspheric, and an inflection point is formed on each of the object-side surface 51 and the image-side surface 52, respectively.

An aperture stop 60 is located between the first lens element 10 and the second lens element 20.

An IR cut filter 70 is located behind the fifth lens element 50 and has no influence on the focal length of the optical lens system.

A sensor cover glass 80 is located behind the IR cut filter 70 and has no influence on the focal length of the optical lens system.

An image plane 90 is located behind the sensor cover glass 80.

The equation of the curve of the aspheric surfaces of the second embodiment has the same form as that of the first embodiment.

In the second embodiment of the present inverse telephoto with correction lenses, the focal length of the first lens element is f1, the focal length of the second lens element is f2, the third and fourth lens elements are glued together, and their effective focal length is f34, the focal length of the fifth lens element is f5, the focal length of the inverse telephoto with correction lenses is f, and they satisfy the relations:

$f/f1=−1.05, f/f2=0.75, f/f34=0.28, f/f5=0.36.$

In the second embodiment of the present inverse telephoto with correction lenses, the on-axis distance between the fourth lens element and the fifth lens element is T45, the focal length of the inverse telephoto with correction lenses is f, and they satisfy the relations:

$T45=0.498$ mm, $T45/f=0.125.$

In the second embodiment of the present inverse telephoto with correction lenses, the refractive index of the first lens element is N1, the refractive index of the second lens element is N2, and they satisfy the relations:

$N1=1.543$ $N2=1.543.$

In the second embodiment of the present inverse telephoto with correction lenses, the radius of curvature of the object-side surface of the second lens element is R3, the radius of curvature of the image-side surface of the second lens element is R4, and they satisfy the relations:

$R3/R4=7.86.$

In the second embodiment of the present inverse telephoto with correction lenses, the total optical length of the optical lens system is TTL, the image height of the optical lens system is ImgH, and they satisfy the relation:

$TTL/ImgH=4.46.$

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 1)
f(focal length) = 4.00 mm, Fno = 2.2, HFOV(half of field of view) = 36.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | −27.01330(ASP) | 0.992 | Plastic | 1.543 | 56.8 | −3.76 |

TABLE 3-continued (Embodiment 1)
f(focal length) = 4.00 mm, Fno = 2.2, HFOV(half of field of view) = 36.1 deg.

| Surface # | | Curvature Radius | Thickness | Material | Index | Abbe # | Focal length |
|---|---|---|---|---|---|---|---|
| 2 | | 2.24759(ASP) | 1.007 | | | | |
| 3 | Aperture Stop | Plano | 0.155 | | | | |
| 4 | Lens 2 | −20.20590(ASP) | 1.584 | Plastic | 1.543 | 56.8 | 5.24 |
| 5 | | −2.57191(ASP) | 0.716 | | | | |
| 6 | Lens 3 | 4.65975 | 2.200 | Glass 'CEMT' | 1.772 | 49.5 | 3.25 |
| 7 | | −4.36966 | 0.010 | | | | |
| 8 | Lens 4 | −4.36966 | 0.686 | Glass | 1.847 | 23.7 | −3.18 |
| 9 | | 7.68272 | 0.498 | | | | |
| 10 | Lens 5 | 100.00000(ASP) | 0.608 | Plastic | 1.530 | 55.8 | 11.01 |
| 11 | | −6.21070(ASP) | 0.700 | | | | |
| 12 | IR-filter | Plano | 0.300 | Glass | 1.517 | 64.1 | |
| 13 | | Plano | 0.600 | | | | |
| 14 | Cover Glass | Plano | 0.400 | Glass | 1.517 | 64.1 | |
| 15 | | Plano | 2.029 | | | | |
| 16 | Image | Plano | | | | | |

TABLE 4

Aspheric Coefficients

| Surface # | 1 | 2 | 4 | 5 | 10 | 11 |
|---|---|---|---|---|---|---|
| K = | −2.23140E+03 | −3.43266E−01 | 1.94266E−01 | 5.02223E−01 | 0.00000E+00 | −8.01814E−01 |
| A4 = | 2.31719E−02 | 7.97767E−02 | 1.01163E−03 | −2.62957E−03 | −3.99448E−03 | 8.68949E−03 |
| A6 = | −5.26313E−03 | −1.25880E−03 | 6.01248E−03 | −5.50929E−04 | 3.65589E−03 | 4.23214E−03 |
| A8 = | 6.80707E−04 | 3.47905E−03 | −5.49300E−03 | −2.89308E−04 | −1.18641E−03 | −9.18676E−04 |
| A10 = | −4.91715E−05 | 2.55893E−03 | 1.89510E−03 | 4.51884E−05 | 7.50783E−05 | 4.81426E−05 |

TABLE 5

| | Embodiment 1 | Embodiment 2 |
|---|---|---|
| f | 3.74 | 4.00 |
| Fno | 2.00 | 2.20 |
| HFOV | 37.7 | 36.1 |
| T45 | 0.776 | 0.498 |
| T45/f | 0.207 | 0.125 |
| N1 | 1.530 | 1.543 |
| N2 | 1.530 | 1.543 |
| f/f1 | −0.85 | −1.05 |
| f/f2 | 0.55 | 0.75 |
| |f/f34| | 0.39 | 0.28 |
| f/f5 | 0.39 | 0.36 |
| R3/R4 | 4.05 | 7.86 |
| TTL/ImgH | 4.23 | 4.46 |

It is to be noted that the tables 1-4 show different data of the different embodiments, however, the data of the different embodiments is obtained from experiments. Therefore, any product of the same structure is deemed to be within the scope of the present invention even if it uses different data. Table 5 is the data relevant to the respective embodiments of the present invention.

While we have shown and described various embodiments in accordance with the present invention, it is clear to those skilled in the art that further embodiments may be made without departing from the scope of the present invention.

What is claimed is:

1. An inverse telephoto with correction lenses comprising five lens elements with refractive power, from the object side to the image side:

a first lens element with negative refractive power having a concave image-side surface;

a second lens element with positive refractive power having a convex image-side surface;

a third lens element with a convex object-side surface;

a fourth lens element with a concave image-side surface;

a fifth lens element with positive refractive power having a convex image-side surface, at least one of surfaces of the fifth lens element being aspheric; and an aperture stop located between the first lens element and the second lens element;

in the optical lens system, at least three of the surfaces of the first, second, third, fourth and fifth lens elements are aspheric;

an object to be photographed is imaged on an electronic sensor, a total track length of the optical lens system is TTL, an image height of the optical lens system is ImgH, and they satisfy the relation:

$TTL/ImgH < 4.75$.

2. The inverse telephoto with correction lenses as claimed in claim 1, wherein the object-side surface and the image-side surface of the fifth lens element are aspheric.

3. The inverse telephoto with correction lenses as claimed in claim 2, wherein at least one of the surfaces of the first and second lens elements is aspheric.

4. The inverse telephoto with correction lenses as claimed in claim 3, wherein the image-side and object-side surfaces of the first, second and fifth lens elements are aspheric.

5. The inverse telephoto with correction lenses as claimed in claim 4, wherein the first, second and fifth lens elements are made of plastic material.

6. The inverse telephoto with correction lenses as claimed in claim 3, wherein the object-side surface of the second lens element is concave.

7. The inverse telephoto with correction lenses as claimed in claim 6, wherein an on-axis distance between the fourth lens element and the fifth lens element is T45, and it satisfies the relation:

$T45>0.1$ mm.

8. The inverse telephoto with correction lenses as claimed in claim 7, wherein both of the object-side and image-side surfaces of the third lens element are convex, and both of the object-side and image-side surfaces of the fourth lens element are concave.

9. The inverse telephoto with correction lenses as claimed in claim 8, wherein the third and fourth lens elements are glued together, and each of the third and fourth lens elements is formed at least with one spherical surface.

10. The inverse telephoto with correction lenses as claimed in claim 7, wherein a focal length of the first lens element is f1, a focal length of the second lens element is f2, a focal length of the inverse telephoto with correction lenses is f, and they satisfy the relations:

$-1.2<f/f1<-0.7$ $0.4<f/f2<0.9$.

11. The inverse telephoto with correction lenses as claimed in claim 10, wherein a focal length of the first lens element is f1, a focal length of the second lens element is f2, a focal length of the inverse telephoto with correction lenses is f, and they satisfy the relations:

$-1.1<f/f1<-0.8$ $0.5<f/f2<0.8$.

12. The inverse telephoto with correction lenses as claimed in claim 9, wherein a combined focal length of the third and fourth lens elements is f34, a focal length of the fifth lens element is f5, a focal length of the inverse telephoto with correction lenses is f, and they satisfy the relations:

$0.1<f/f34<0.5$ $0.1<f/f5<0.5$.

13. The inverse telephoto with correction lenses as claimed in claim 7, wherein a radius of curvature of the object-side surface of the second lens element is R3, a radius of curvature of the image-side surface of the second lens element is R4, and they satisfy the relation:

$3.0<R3/R4<9.0$.

14. The inverse telephoto with correction lenses as claimed in claim 10, wherein the object-side surface of the first lens element is convex, and the object-side surface of the fifth lens element is concave.

15. The inverse telephoto with correction lenses as claimed in claim 10, wherein the object-side surface of the first lens element is concave, the object-side surface of the fifth lens element is convex, and a value of radius of curvature at a periphery of the object-side surface of the first lens element is positive.

16. The inverse telephoto with correction lenses as claimed in claim 2, wherein inflection points are formed on the fifth lens element.

17. The inverse telephoto with correction lenses as claimed in claim 4, wherein a refractive index of the first lens element is N1, a refractive index of the second lens element is N2, and they satisfy the relations:

$1.52<N1<1.6$ $1.52<N2<1.6$.

18. An inverse telephoto with correction lenses comprising five lens elements with refractive power, from the object side to the image side:

a first lens element with negative refractive power having a concave image-side surface;

a second lens element with positive refractive power having a concave object-side surface and a convex image-side surface;

a third lens element with a convex object-side surface;

a fourth lens element with a concave image-side surface;

a fifth lens element with positive refractive power having a convex image-side surface; and an aperture stop located between the first lens element and the second lens element;

in the optical lens system, at least two of the surfaces of the first, second, third, fourth and fifth lens elements are aspheric;

an on-axis spacing of the fourth lens element and the fifth lens element is T45, and it satisfies the relation:

$T45/f>0.02$ an object to be photographed is imaged on an electronic sensor, a total track length of the optical lens system is TTL, an image height of the optical lens system is ImgH, and they satisfy the relation:

$TTL/ImgH<4.75$.

* * * * *